May 14, 1957

H. J. GERBER 2,791,836

INSTRUMENT FOR MEASURING THE SLOPE OF A CURVE AT
A SELECTED POINT THEREON

Filed Dec. 21, 1955

INVENTOR.
HEINZ JOSEPH GERBER

BY Teller & McCormick

ATTORNEYS

May 14, 1957 H. J. GERBER 2,791,836
INSTRUMENT FOR MEASURING THE SLOPE OF A CURVE AT
A SELECTED POINT THEREON
Filed Dec. 21, 1955 2 Sheets-Sheet 2
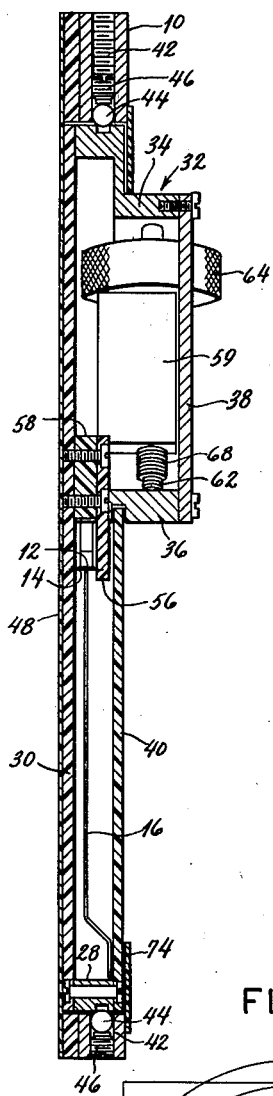
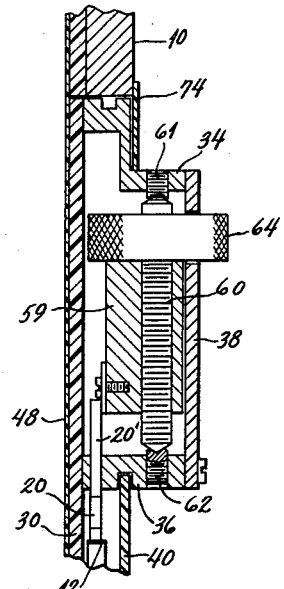
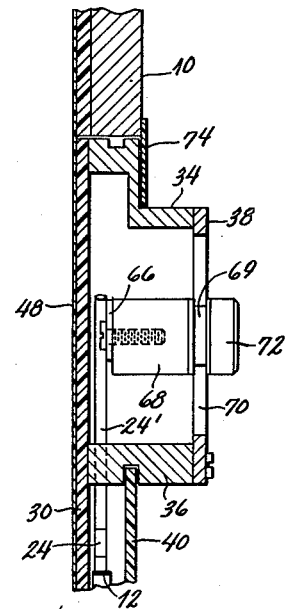
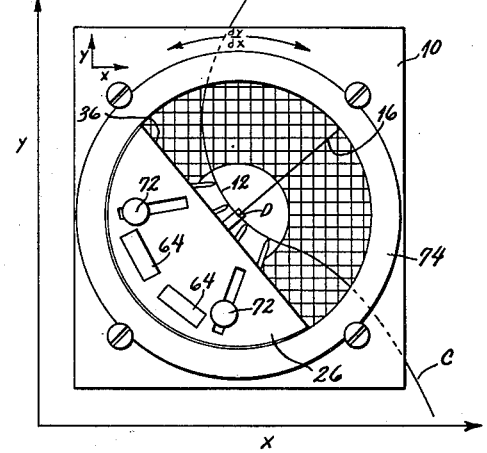
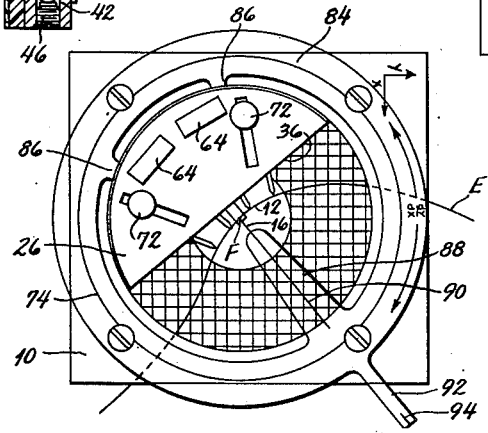
INVENTOR.
HEINZ JOSEPH GERBER
BY Tella & McCormick
ATTORNEYS

United States Patent Office 2,791,836
Patented May 14, 1957

2,791,836

INSTRUMENT FOR MEASURING THE SLOPE OF A CURVE AT A SELECTED POINT THEREON

Heinz Joseph Gerber, Hartford, Conn., assignor to The Gerber Scientific Instrument Company, Hartford, Conn., a corporation of Connecticut Application December 21, 1955, Serial No. 554,482

17 Claims. (Cl. 33—1)

The invention relates to an instrument for measuring the slope or derivative of a plotted graph or curve at a selected point thereon.

The general object of the invention is to provide a simple instrument which can be placed over a curve and which will graphically indicate the slope, or the normal to the slope, of the curve at a selected point thereon.

Other and more specific objects of the invention are to provide various details and features of construction and arrangement that contribute toward the attainment of the before-stated general object.

A still further object of the invention is to provide a tool adapted for use with the aforesaid instrument for facilitating the drawing of a line perpendicular to a curve at a selected point thereon.

The drawings show preferred embodiments of the invention in detail, but it will be understood that various changes may be made from the constructions shown, and that the drawings are not to be construed as defining or limiting the scope of the invention, the claims forming a part of this specification being relied upon for that purpose.

Of the drawings:

Fig. 5 is a vertical sectional view taken along the line 5—5 of Fig. 1.

Fig. 6 is a fragmentary sectional view taken along the line 6—6 of Fig. 1.

Fig. 7 is a fragmentary sectional view taken along the line 7—7 of Fig. 1.

Fig. 8 is a front view on a reduced scale showing the instrument with the movable parts thereof in positions of use different from those shown in Fig. 1.

Fig. 9 is a view somewhat similar to Fig. 8 but additionally showing an auxiliary tool that may be used with the instrument.

Figure 1:
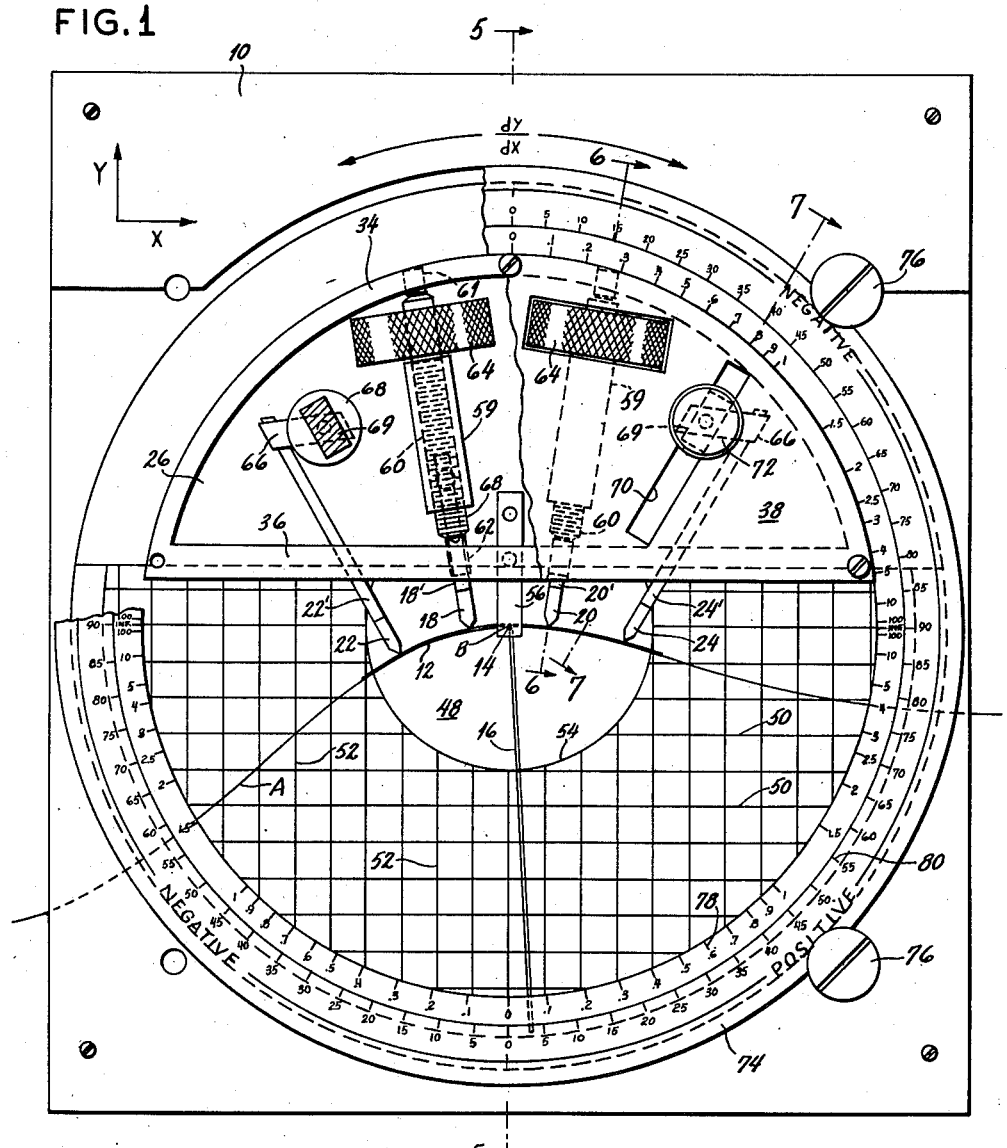
Fig. 1 is a front view of an instrument embodying the invention with certain parts broken away.
Figure 2:
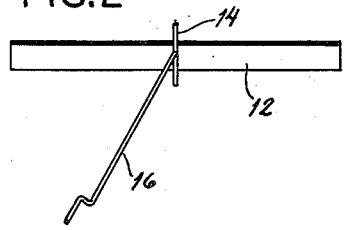
Fig. 2 is a fragmentary enlarged perspective view of certain parts of the instrument.

Referring to Figs. 1 and 2 of the drawings, the instrument comprises a main frame 10 provided with a rear face engageable with a rear flat surface carrying a chart having a graph or curve such as A thereon, said curve being related to a predetermined axis. A resilient flexible spring or strip 12 is provided which is parallel with said rear face of the frame 10 and is spaced forwardly therefrom. Preferably the flexible resilient strip 12 is initially substantially straight and is inherently biased toward substantial straightness. The strip 12 has been described as initially substantially straight, but it is preferred to have the strip in its relaxed condition slightly curved so as to be concave at the top and convex at the bottom. The strip 12 is so positioned in relation to the frame that an area of said rear flat surface behind and adjacent said strip is visible from the front, and the strip is preferably located in an opening in the frame through which said area of the rear flat surface is visible.

A means is provided which engages the strip 12 for supporting it for movement about a pivotal axis which is in fixed relation to said frame and which is perpendicular to said rear face thereof. The last said means is preferably a pivot pin 14 perpendicular to the rear face of the frame and having a central pivotal axis, said pivot pin 14 being rotatably supported on said frame. An indicator needle 16 is connected with said strip 12 at the pivotal axis and is preferably indirectly connected with said strip by means of said pivot pin 14, the needle being freely movable with the strip. The needle 16 is at a fixed predetermined angle to the strip 12 at the point of connection therewith and it extends in general parallelism with the rear face of the frame. Preferably and as shown, the needle 16 is at an angle of 90° to said strip 12. Means is provided on the frame for flexing the resilient strip 12 at both sides of the pivotal axis at 14. When the strip is initially straight or substantially so and is biased toward substantial straightness, said means for flexing the strip comprises movable probes 18, 20, 22 and 24 engageable with the strip only at the upper face thereof, that is, at the face opposite the needle. The means for flexing the strip do not move the pivotal axis at 14, and the needle 16 remains at the said predetermined angle to the strip at the point of connection therewith notwithstanding said flexing.

In use and as illustrated in Fig. 1, the frame 10 is so positioned on the said rear flat surface that the strip axis 14 is at a selected point B on the curve A. By means of the movable probes 18, 20, 22 and 24 the shape of said strip 12 at both sides of said axis 14 may be conformed to the shape of said curve A at both sides of said selected point B. The result is that said needle 16 extends at said predetermined angle, preferably 90°, to a line tangent to the curve A at said selected point B. As will be more fully explained, means is preferably provided on the frame for indicating the angle of said needle with respect to the axis of the curve and this last said angle is a function of the slope or derivative of said curve A at said selected point B.

The foregoing is a brief general description of an instrument embodying the invention and of its manner of use. The following detailed description relates more specifically to the presently preferred embodiments of the invention as shown in the drawings, and more particularly in Figs. 1 to 7 thereof.

The frame 10 is a flat plate, preferably rectangular. The flexible strip 12 and the needle 16 and the means for flexing the strip are all supported on a carrier 26 which is preferably rotatably adjustable on the frame 10 about a central axis perpendicular to the rear face of the frame and coincident with the axis at 14. Preferably the frame 10 has a large circular opening therein and the carrier 26 is entered in said opening and is rotatably movable therein.

As best shown in Fig. 5, the carrier 26 comprises a ring 28 within the opening in the frame 10 and also comprises a circular flat plate 30 of transparent plastic material secured to the ring at the rear thereof. The carrier further comprises a housing 32 secured to or formed integrally with the ring 28 and projecting forwardly therefrom. The housing 32 has an upper wall 34 which is partly cylindrical and which is concentric with the axis at 14, and said housing has a lower wall 36 which is flat and is spaced upwardly from said axis at 14 when the carrier is positioned as shown in Figs. 1 and 5. The lower wall 36 extends rearwardly so as to engage the transparent rear plate 30. The housing also includes a front cover 38 secured to said upper and lower walls 34 and 36. A partly circular flat plate 40 of transparent plastic material is provided which is secured to the ring 28 at the front thereof, said plate having a straight transverse upper edge which abuts against the lower wall 36 of the housing 32.

The ring 28 of the carrier has a peripheral groove and the frame 10 has a plurality of radial holes 42, 42 in which are balls 44, 44 entered in said groove in the ring. The balls are held in place by screws 46, 46 and the balls hold the carrier in such manner that it can be rotatively adjusted. Although the carrier is rotatively adjustable, the position shown in Figs. 1 and 3 will, for convenience, be referred to as the "normal" position. In this position the lower wall 36 of the housing is transverse and is parallel with the bottom of the frame 10.

Fixedly secured to the rear of the frame 10 is a sheet 48 of transparent plastic material, this sheet being inscribed with uniformly spaced horizontal and vertical lines 50, 50 and 52, 52 constituting a grid. Preferably said plate is also inscribed with a circular line 54 concentric with the axis at 14, said lines 50, 50 and 52, 52 terminating at said circular line so that the area within the circle is unobstructed. The grid 50, 50, 52, 52 and the circle 54 are visible through the transparent plates 40 and 30 of the carrier. The frame may be marked with X and Y coordinates as shown.

The before-mentioned pivot pin 14 is entered at the rear in a bearing aperture in the rear plate 30 and is entered at the front in a bearing aperture in an auxiliary plate 56, said pin being freely movable in said bearing apertures. Said auxiliary plate 56 extends through a notch in the lower housing wall 36 and it is secured to said rear plate 30, an intervening spacer 58 being provided. The said thin spring or strip 12 is shown in Figs. 2 and 5 as being soldered or otherwise secured to the pivot pin 14 at the top thereof, said strip being between the front and rear plates of the carrier and parallel therewith and preferably being initially straight or slightly curved upwardly. This strip 12 can be flexed as has been described, but its inherent resiliency tends to return it to its initial substantial straightness. The soldering or other connection of the strip 12 to the pivot pin 14 is so controlled that the resiliency of the strip is not materially affected. The said indicator needle 16 is soldered or otherwise secured to the pivot pin, and when the strip 12 is straight or substantially straight the needle is at the predetermined angle to the strip which angle is preferably 90°.

The spring strip 12 is shown in Fig. 2 as being rectangular in cross-section. The dimensions of the strip and of the pivot pin 14 and of the needle 16 may be varied, but the following dimensions have been found to be suitable: width of strip $\frac{1}{16}$"; thickness of strip .003"; diameter of pin .012"; diameter of needle .012".

Figure 3:
Fig. 3 is an enlarged cross-sectional view of an alternative flexible strip.

Fig. 3 shows an alternative spring strip 12$^a$ which has a cross-sectional shape sharply tapered toward its edges. This shape has the advantage that the metal is subject during flexing to a more nearly constant stress.

Figure 4:
Fig. 4 is an enlarged cross-sectional view of another alternative flexible strip.

Fig. 4 shows an alternative spring strip 12$^b$ which has a cross sectional shape that is slightly curved transversely. A strip having this shape has a greater tendency to remain straight and to return to straightness after flexing.

For flexing the strip 12, or either of the alternative strips 12$^a$ and 12$^b$, the before-mentioned probes 18, 20 and 22, 24 are provided, said probes being connected to or being integral with rods 18', 20', 22' and 24' that extend through apertures in the lower housing wall 36. Said probes are engageable with the upper face of the strip 12 and they are movable parallelly with the plates 30 and 40 of the carrier, two of the probes being at one side of the axis at 14 and the other two of them being at the other side of said axis. The two probes 18 and 20 are similar and they have similar control means and a description of one will suffice. Each probe rod 18' or 20' is secured to a block 59 which has threaded engagement with a screw 60 parallel with said probe. Recessed screws 61 and 62 in the housing walls 34 and 36 provide bearings for the screw 60 and said screw has a knurled knob 64 which projects through an opening in the housing cover 38. By means of the knob 64 the corresponding probe 18 or 20 can be moved to engage and flex the strip 12. The two probes 22 and 24 are similar and they have similar control means and a description of one will suffice. Each probe rod 22' or 24' is rigidly connected with a metallic strip 66 which in turn is rigidly connected with a preferably cylindrical block 68 having a flattened forward extension 69 projecting into a slot 70 in the housing cover 38, said slot 70 being parallel to the corresponding probe 22 or 24. A button 72 on the extension 69 is at the front of the cover 38 and is manually engageable for the movement of said block 68 and of the corresponding probe 22 or 24. By means of the probes 18, 20 and 22, 24 the strip 12 can, within reasonable limits, be pivotally moved about the central axis 14 and can be downwardly flexed.

When the strip 12 is steel as is preferred, the probe rods 18', 20', 22' and 24' may be formed of nonmagnetic metal and the probes 18, 20, 22 and 24 may be magnets secured to said rods. As shown in Fig. 1, the magnetic probes 22 and 20 have their North or positive poles engaging the strip 12 and the magnets 18 and 24 have their South or negative poles engaging the strip 12. When the probes are magnetic as last above described, the strip 12 can be curved upwardly within reasonable limits by the magnetic action of said probes so as to conform to the shape of an upwardly concave curve.

Secured to the frame 10 is a graduated thin flat ring 74. Said ring 74 is adjacent the outer end portion of the needle 16 so that the needle can register with graduations on the ring. As shown, the ring is transparent and the inner portion of the ring overlies the outer portion of the needle so that the position of the needle can be determined by looking rearwardly through the ring. Preferably the end portion of the needle 16 is bent forwardly as shown in Fig. 2 so as to be as close as possible to the scale ring 74. This minimizes inaccuracies in reading the values on the scales. The ring 74 is held in place on the frame by screws 76, 76.

The ring 74 can be variously graduated, but as shown it has graduations 78 which, in each quadrant, represent the tangents of angles running from 0° to 90°, said angles representing the slopes or derivatives of graphs at selected points thereon. Preferably the ring also has graduations 80 which, in each quadrant, directly represent the said angles running from 0° to 90°. It will be observed that the graduations extend oppositely in adjacent quadrants, two of the quadrants being marked "Positive" and the other two of the quadrants being marked "Negative."

By loosening the screws 76, 76, the ring 74 can be readily replaced by a different ring having different graduations. The ring 74 is also rotatably movable or adjustable when said screws 76 are loosened.

As has been explained, the instrument serves to indicate or measure the slope or derivative of a graph or curve at a selected point thereon. When the instrument is to be so used, it is superposed on said curve with the axis at 14 registering with the said selected point and with the probes 18, 20, 22 and 24 at the convex side of said curve at said selected point thereon. When the probes are magnetic and when the concavity of the curve is slight, the probes may be at the concave side of the curve.

Referring again to Fig. 1, it will be observed that the instrument is on a chart having a curve A thereon, it being desired to determine the slope or derivative of the curve at a selected point B on said curve. A portion of the curve A is readily visible through the transparent plates 40 and 30 and through the transparent rear sheet 48. The instrument has been positioned so that the axis at 14 is on the point B and so that the grid lines 50, 50 are parallel to the axis of the curve. With the instrument so positioned the frame thereof is not thereafter moved. In the particular example shown, the X and Y coordinates are positive with respect to the chart. The entire carrier 26 is angularly adjusted to the extent necessary to bring the lower housing wall 30 approximately parallel with the tangent to the curve A through said point B. In the example shown, said tangent is approximately horizontal and said lower wall 30 is horizontal.

By means of the probes 18, 20, 22 and 24 the strip 12 is moved angularly about its axis at 14 or is flexed or is both angularly moved and flexed so that the position and shape of said strip correspond or conform as exactly as possible to the position and shape of said curve. The flexing of the strip 12 does not disturb the said predetermined angular relationship between the strip and the needle at the pivotal axis. When the needle is initially perpendicular to the strip, said needle remains perpendicular to a tangent to said strip at said pivotal axis, notwithstanding the flexing of the strip. Inasmuch as the shape of the spring has been conformed to the shape of the curve, the needle is perpendicular or normal to a tangent to the curve extending through said selected point. The angle of the needle 16 is indicated by the graduations on the ring 74. The said ring 74 is so positioned that the readings thereon represent the actual slope of the normal and not the needle angle which is the normal to such slope. It will be obvious, however, that the normal angle can be indicated by rotatively shifting the ring 74 through 90°. Such shifting of the ring can be effected by turning the ring relatively to the frame through 90° or by turning the frame and ring as a unit through 90°. In the example shown in Fig. 1, the needle 16 has been shifted to a position representing the angle of the normal to said tangent through the curve A at the selected point B. The reading of the needle on the graduations on the ring 74 gives the actual slope angle and not the needle angle, and said slope angle is shown as being 3°, the tangent of said angle being .052. The said slope angle is positive as indicated by the marking of the corresponding quadrant. If the needle were inclined toward the left, instead of toward the right, the slope angle would be negative and the quadrant marking would so indicate.

The instrument may be readily calibrated to correct any inaccuracy in the reading at the needle. For calibration, the instrument is placed on a chart having a horizontal straight line thereon, the horizontal grid lines 50, 50 being parallel to said horizontal chart line and the axis at 14 being on said straight line. The carrier 26 is adjusted so that the wall 36 is parallel to said straight line, and the probes are moved so that the strip 12 conforms exactly to said straight line. The needle 16 should then register with 0 on the graduated ring 74. If the needle does not so register, the ring is adjusted until the needle does so register. Although it is preferred that the needle be exactly perpendicular to the strip, accuracy in this respect is not essential and any deviation can be corrected by calibration.

Fig. 8 is generally similar to Fig. 1 but it is on a reduced scale and partly schematic and shows the instrument in a different position for measuring the slope or derivative of a curve C at a point D thereon. The procedure is exactly as described in connection with Fig. 1. The carrier 26 has been adjusted to such a position that the probes are at the convex side of the curve at said point D and so that the wall 36 is approximately parallel to the tangent to the curve C at said point, said wall in the example given being at an angle of a little more than 45°. By means of the probes the shape of the strip 12 has been conformed to the shape of the curve, and the needle 16 indicates the angle or slope of the tangent through the curve at the selected point D.

Fig. 9 is similar to Fig. 8 but it also shows an auxiliary tool. Said Fig. 9 shows the instrument indicating the slope or derivative of a curve E at a point F thereon. The procedure is the same as described in connection with Figs. 1 and 8 and repetition is unnecessary.

It is sometimes desirable not only to indicate the angle of the tangent to a curve at a selected point, but also to draw a line on the chart normal or perpendicular to said curve at said point. In order that this may be conveniently done an auxiliary tool 84 may be provided as shown in Fig. 9.

The tool 84 may be widely varied as to details but as shown it is generally ring-like so as to surround the housing 32 of the instrument. Said tool includes a first portion shaped to provide means such as two faces at 86, 86 adapted to engage a curved wall on the carrier concentric with the axis of adjustment thereof, which wall is shown as being the upper convex partly cylindrical wall 34 of said housing 32. Said tool is provided with a second portion having a line thereon which is radial when said first portion is engaged with said concentric wall, and as shown said second portion is at the opposite side of said axis from said first portion and said second portion includes an inwardly extending finger 88 having a line 90 thereon. The said second portion of the tool may be transparent and the line 90 may be inscribed on the front thereof. By manually moving the tool the line 90 may be brought into register with the needle 16 in any position thereof. The tool 84 is further provided with an outwardly extending finger 92 which is offset rearwardly so that its rear face is in the same plane as the rear face of the instrument. Said finger 92 has an indicator 94 thereon which is in line with an extension of the line 90 on the finger 88.

In using the tool 84, the instrument is adjusted as previously described so that the needle 16 is at an angle perpendicular to a tangent through the selected point F on the curve E. Then with the faces 86, 86 of the instrument engaging the instrument wall 34, the line 90 is registered with the needle 16 and a mark is made on the chart at the indicator 94. After that the instrument and the tool are removed and a line is drawn on the chart through the points at F and 94. Said line is normal to a tangent through the curve E at the point F.

It has been stated that it is not necessary for the needle 16 to be exactly perpendicular to the strip 12 inasmuch as errors can be corrected by calibration. This statement is correct for the ordinary uses of the instrument, but when the tool 84 is to be used it is necessary that the needle be exactly perpendicular to the strip.

The invention claimed is:

1. In an instrument of the class described, the combination of a frame provided with a rear face engageable with a rear flat surface having a curve thereon, a resilient flexible strip parallel with said rear face of the frame and spaced forwardly therefrom which strip is so positioned in relation to the frame that an area of said flat surface behind and adjacent said strip is visible from the front, means engaging the strip between the ends thereof for supporting said strip for movement about a pivotal axis in fixed relation to said frame and perpendicular to said rear face thereof, an indicator needle connected with said strip at said pivotal axis and freely movable with said strip which needle is at a fixed predetermined angle to the strip at the point of connection therewith and extends in general parallelism with said rear face of the frame, and means carried by the frame for flexing the strip at both sides of said pivotal axis so that, when said frame is positioned on said flat surface with said pivotal axis at a selected point on said curve, the shape of said strip at both sides of said axis may be conformed to the shape of said curve at both sides of said selected point with the result that said needle extends at said predetermined angle to a line tangent to the curve at said selected point.

2. An instrument as set forth in claim 1, wherein the resilient flexible strip is initially substantially straight and is inherently biased toward initial straightness.

3. In an instrument for measuring the slope or derivative of a curve at a selected point thereon, the combination of a frame provided with a rear face engageable with a rear flat surface having said curve thereon related to a predetermined axis, a resilient flexible strip parallel with said rear face of the frame and spaced forwardly therefrom which strip is so positioned in relation to the frame that an area of said flat surface behind and adjacent said strip is visible from the front, means engaging the strip between the ends thereof for supporting said strip for movement about a pivotal axis in fixed relationship to said frame and perpendicular to said rear face thereof, an indicator needle connected with said strip at said pivotal axis and freely movable with said strip which needle is at a fixed predetermined angle to the strip at the point of connection therewith and extends in general parallelism with said rear face of the frame, means carried by the frame for flexing the strip at both sides of said pivotal axis so that, when said frame is positioned on said flat surface with said pivotal axis at said selected point on said curve, the shape of said strip at both sides of said axis may be conformed to the shape of said curve at both sides of said selected point with the result that said needle extends at said predetermined angle to a line tangent to the curve at said selected point, and means on the frame for indicating the angle of said needle with respect to said curve axis which last said angle is a function of the slope or derivative of said curve at said selected point.

4. In an instrument of the class described, the combination of a frame provided with a rear face engageable with a rear flat surface having a curve thereon, a resilient flexible strip parallel with said rear face of the frame and spaced forwardly therefrom which strip is initially substantially straight and is inherently biased toward substantial straightness and which strip is so positioned in relation to the frame that an area of said flat surface behind and adjacent said strip is visible from the front, a pivot pin connected to the strip between the ends thereof and supported on said frame for movement about a fixed axis perpendicular to said rear frame face, an indicating needle connected with said strip at said pivotal axis and freely movable with said strip which needle is at a fixed predetermined angle to the strip at said pivot pin and extends in general parallelism with said rear face of the frame, a plurality of probes rectilinearly movable on said frame in parallelism with said rear face of the frame and engageable with said strip some at one side of said pivot pin and others at the opposite side of said pivot pin, said probes being separately movable for flexing the strip at both sides of said pivotal axis so that, when said frame is positioned on said flat surface with said pivot pin at said selected point on said curve, the shape of said strip at both sides of said axis may be conformed to the shape of said curve at both sides of said selected point with the result that said needle extends at said predetermined angle to a line tangent to the curve at said selected point.

5. In an instrument for measuring the slope or derivative of a curve at a selected point thereon, the combination of a frame provided with a rear face engageable with a rear flat surface having said curve thereon related to a predetermined axis, a resilient flexible strip parallel with said rear face of the frame and spaced forwardly therefrom which strip is initially substantially straight and is inherently biased toward substantial straightness and which strip is so positioned in relation to the frame that an area of said flat surface behind and adjacent said strip is visible from the front, a pivot pin connected to the strip between the ends thereof and supported on said frame for movement about a fixed axis perpendicular to said rear frame face, an indicating needle connected with said strip at said pivotal axis and freely movable with said strip which needle is at a fixed predetermined angle to the strip at said pivot pin and extends in general parallelism with said rear face of the frame, a plurality of probes rectilinearly movable on said frame in parallelism with said rear face of the frame and engageable with said strip some at one side of said pivot pin and others at the opposite side of said pivot pin, said probes being separately movable for flexing the strip at both sides of said pivotal axis so that, when said frame is positioned on said flat surface with said pivot pin at said selected point on said curve, the shape of said strip at both sides of said axis may be conformed to the shape of said curve at both sides of said selected point with the result that said needle extends at said predetermined angle to a line tangent to the curve at said selected point, and means on the frame for indicating the angle of said needle with respect to said curve axis which last said angle is a function of the slope or derivative of said curve at said selected point.

6. In an instrument of the class described, the combination of a frame provided with a rear face engageable with a rear flat surface having a curve thereon, a resilient flexible steel strip parallel with said rear face of the frame and spaced forwardly therefrom which strip is initially substantially straight and is inherently biased toward substantial straightness and which strip is so positioned in relation to the frame that an area of said flat surface behind and adjacent said strip is visible from the front, a pivot pin connected to the strip between the ends thereof and supported on said frame for movement about a fixed axis perpendicular to said rear frame face, an indicating needle connected with said strip at said pivotal axis and freely movable with said strip which needle is at a fixed predetermined angle to the strip at said pivot pin and extends in general parallelism with said rear face of the frame, a plurality of probes each comprising a magnet rectilinearly movable on said frame in parallelism with said rear face of the frame and engageable with said strip some at one side of said pivot pin and others at the opposite side of said pivot pin, said probes being separately movable for flexing the strip at both sides of said pivotal axis either convexly or concavely so that, when said frame is positioned on said flat surface with said pivot pin at said selected point on said curve, the shape of said strip at both sides of said axis may be conformed to the shape of said curve at both sides of said selected point with the result that said needle extends at said predetermined angle to a line tangent to the curve at said selected point.

7. In an instrument for measuring the slope or derivative of a curve at a selected point thereon, the combination of a frame provided with a rear face engageable with a rear flat surface having said curve thereon related to a predetermined axis, a resilient flexible strip parallel with said rear face of the frame and spaced forwardly therefrom which strip is so positioned in relation to the frame that an area of said flat surface behind and adjacent said strip is visible from the front, means engaging the strip between the ends thereof for supporting said strip for movement about a pivotal axis in fixed relationship to said frame and perpendicular to said rear face thereof, an indicator needle connected with said strip at said pivotal axis and freely movable with said strip which needle is at a fixed predetermined angle to the strip at the point of connection therewith and extends in general parallelism with said rear face of the frame, means carried by the frame for flexing the strip at both sides of said pivotal axis so that, when said frame is positioned on said flat surface with said pivotal axis at said selected point on said curve, the shape of said strip at both sides of said axis may be conformed to the shape of said graph at both sides of said selected point with the result that said needle extends at said predetermined angle to a line tangent to the curve at said selected point, and a ring on the frame concentric with said pivotal axis and having circumaxially spaced graduations for indicating the angle of said needle with respect to said curve axis which last said angle is a function of the slope or derivative of said curve at said selected point.

8. An instrument as set forth in claim 7, wherein the graduated ring is rotatably adjustable about said pivotal axis, and wherein means is provided on the frame for locking said ring in adjusted position.

9. In an instrument for measuring the slope or derivative of a curve at a selected point thereon, the combination of a frame provided with a relatively large opening therein extending from the front toward the rear and said frame including at its rear a transparent sheet that extends across said opening, the rear of said sheet being engageable with a rear flat surface having a curve thereon related to a predetermined axis and said sheet being provided with lines constituting a grid visible through said frame opening for conveniently locating said frame with respect to said curve and the axis thereof, a resilient flexible strip located within said frame opening and at the front of said transparent sheet which strip is parallel with said transparent sheet, means engaging the strip between the ends thereof for supporting said strip for movement about a pivotal axis in fixed relationship to said frame and perpendicular to said rear face thereof, an indicator needle connected with said strip at said pivotal axis and freely movable with said strip which needle is at a fixed predetermined angle to the strip at the point of connection therewith and extends in general parallelism with said rear face of the frame, means carried by the frame for flexing the strip at both sides of said pivotal axis so that, when said frame is positioned on said flat surface with said pivotal axis at said selected point on said curve, the shape of said strip at both sides of said axis may be conformed to the shape of said curve at both sides of said selected point with the result that said needle extends at said predetermined angle to a line tangent to the curve at said selected point, and means on the frame for indicating the angle of said needle with respect to said curve axis which last said angle is a function of the slope or derivative of said curve at said selected point.

10. In an instrument of the class described, the combination of a frame provided with a rear face engageable with a rear flat surface having a curve thereon, a carrier rotatably adjustable on said frame about an axis in fixed relation to said frame and perpendicular to said rear face thereof, a resilient flexible strip on said carrier parallel with said rear face of the frame and spaced forwardly therefrom which strip is so positioned in relation to the frame and the carrier that an area of said flat surface behind and adjacent said strip is visible from the front, means on the carrier engaging the strip between the ends thereof for supporting said strip for pivotal movement about a pivotal axis coincident with the axis of adjustment of the carrier, an indicator needle connected with said strip at said pivotal axis thereof and freely movable with said strip which needle is at a fixed predetermined angle to the strip at the point of connection therewith and extends in general parallelism with said rear face of the frame, and means on the carrier for flexing the strip at both sides of said pivotal axis thereof so that, when said frame is positioned on said flat surface with said pivotal axis of the strip at a selected point on said curve, the shape of said strip at both sides of said axis may be conformed to the shape of said curve at both sides of said selected point with the result that said needle extends at said predetermined angle to a line tangent to the curve at said selected point.

11. In an instrument for measuring the slope or derivative of a curve at a selected point thereon, the combination of a frame provided with a rear face engageable with a rear flat surface having a curve thereon, a carrier rotatably adjustable on said frame about an axis in fixed relation to said frame and perpendicular to said rear face thereof, a resilient flexible strip on said carrier parallel with said rear face of the frame and spaced forwardly therefrom which strip is so positioned in relation to the frame and the carrier that an area of said flat surface behind and adjacent said strip is visible from the front, means on the carrier engaging the strip between the ends thereof for supporting said strip for pivotal movement about a pivotal axis coincident with the axis of adjustment of the carrier, an indicator needle connected with said strip at said pivotal axis thereof and freely movable with said strip which needle is at a fixed predetermined angle to the strip at the point of connection therewith and extends in general parallelism with said rear frame face, means on the carrier for flexing the strip at both sides of said pivotal axis thereof so that, when said frame is positioned on said flat surface with said pivotal axis of the strip at a selected point on said curve, the shape of said strip at both sides of said axis may be conformed to the shape of said curve at both sides of said selected point with the result that said needle extends at said predetermined angle to a line tangent to the curve at said selected point, and means in normally fixed position on the frame for indicating the angle of said needle with respect to said curve axis which last said angle of the needle is a function of the slope or derivative of said curve at said selected point.

12. In an instrument for measuring the slope or derivative of a curve at a selected point thereon, the combination of a frame provided with a rear face engageable with a rear flat surface having a curve thereon, a carrier rotatably adjustable on said frame about an axis in fixed relation to said frame and perpendicular to said rear face thereof, a resilient flexible strip on said carrier parallel with said rear face of the frame and spaced forwardly therefrom which strip is initially substantially straight and is inherently biased toward substantial straightness and which strip is so positioned in relation to the frame and the carrier that an area of said flat surface behind and adjacent said strip is visible from the front, a pivot pin on the carrier connected to the strip between the ends thereof and supported for movement about a pivotal axis coincident with the axis of adjustment of the carrier, an indicating needle connected with said strip at said pivotal axis and freely movable with said strip, which needle is at a fixed predetermined angle to the strip at said pivot pin and extends in general parallelism with said rear face of the frame, a plurality of probes rectilinearly movable on said carrier in parallelism with said rear face of the frame and engageable with said strip some at one side of said pivot pin and others at the opposite side of said pivot pin, said probes being separately movable for flexing the strip at both sides of said pivotal axis thereof so that, when said frame is positioned on said flat surface with said pivotal axis of the strip at a selected point on said curve, the shape of said strip at both sides of said axis may be conformed to the shape of said curve at both sides of said selected point with the result that said needle extends at said predetermined angle to a line tangent to the curve at said selected point, and means in normally fixed position on the frame for indicating the angle of said needle with respect to said curve axis which last said angle of the needle is a function of the slope or derivative of said curve at said selected point.

13. In an instrument for measuring the slope or derivative of a curve at a selected point thereon, the combination of a frame provided with a rear face engageable with a rear flat surface having a curve thereon, a carrier rotatably adjustable on said frame about an axis in fixed relation to said frame and perpendicular to said rear face thereof, a resilient flexible strip on said carrier parallel with said rear face of the frame and spaced forwardly therefrom which strip is so positioned in relation to the frame and the carrier that an area of said flat surface behind and adjacent said strip is visible from the front, means on the carrier engaging the strip between the ends thereof for supporting said strip for pivotal movement about a pivotal axis coincident with the axis of adjustment of the carrier, an indicator needle connected with said strip at said pivotal axis thereof and freely movable with said strip which needle is at a fixed predetermined angle to the strip at the point of connection therewith and extends in general parallelism with said rear frame face, means on the carrier for flexing the strip at both sides of said pivotal axis thereof so that, when said frame is positioned on said flat surface with said pivotal axis of the strip at a selected point on said curve, the shape of said strip at both sides of said axis may be conformed to the shape of said curve at both sides of said selected point with the result that said needle extends at said predetermined angle to a line tangent to the curve at said selected point, and a ring on the frame concentric with adjustment axis of the carrier and said pivotal axis of the strip and having circumaxially spaced graduations for indicating the angle of said needle with respect to said curve axis which last said angle is a function of the slope or derivative of said curve at said selected point.

14. In an instrument for measuring the slope or derivative of a curve at a selected point thereon, the combination of a frame provided with a rear face engageable with a rear flat surface having a curve thereon, said frame having an opening through which a portion of said rear flat surface is visible, a carrier rotatably adjustable on said frame about an axis in fixed relation to said frame and perpendicular to said rear face thereof, said carrier having an area in register with said opening in the frame and transparent from front to rear, a resilient flexible strip on said carrier and within said transparent area thereof which strip is parallel with said rear face of the frame and is spaced forwardly therefrom, means on the carrier engaging the strip between the ends thereof for supporting said strip for pivotal movement about a pivotal axis coincident with the axis of adjustment of the carrier, an indicator needle connected with said strip at said pivotal axis thereof and freely movable with said strip which needle is at a fixed predetermined angle to the strip at the point of connection therewith and extends in general parallelism with said rear frame face, means on the carrier for flexing the strip at both sides of said pivotal axis thereof so that, when said frame is positioned on said flat surface with said pivotal axis of the strip at a selected point on said curve, the shape of said strip at both sides of said axis may be conformed to the shape of said curve at both sides of said selected point with the result that said needle extends at said predetermined angle to a line tangent to the curve at said selected point, and means in normally fixed position on the frame for indicating the angle of said needle with respect to said curve axis which last said angle of the needle is a function of the slope or derivative of said curve at said selected point.

15. An instrument as set forth in claim 14, wherein said frame includes at its rear a transparent sheet that extends across said opening in the frame, the rear face of said sheet being engageable with a rear flat surface having a curve thereon related to a predetermined axis and said sheet being provided with lines constituting a grid visible through said frame opening and through said carrier area for conveniently locating said frame with respect to said curve and the axis thereof.

16. In an instrument of the class described, the combination of a frame provided with a rear face engageable with a rear flat surface having a curve thereon, a carrier rotatably adjustable on said frame about an axis in fixed relation to said frame and perpendicular to said rear face thereof, a resilient flexible strip on said carrier parallel with said rear face of the frame and spaced forwardly therefrom which strip is so positioned in relation to the frame and the carrier that an area of said flat surface behind and adjacent said strip is visible from the front, means on the carrier engaging the strip between the ends thereof for supporting said strip for pivotal movement about a pivotal axis coincident with the axis of adjustment of the carrier, an indicator needle connected with said strip at said pivotal axis thereof and freely movable with said strip which needle is at a fixed predetermined angle to the strip at the point of connection therewith and extends in general parallelism with said rear face of the frame, means on the carrier for flexing the strip at both sides of said pivotal axis thereof so that, when said frame is positioned on said flat surface with said pivotal axis of the strip at a selected point on said curve, the shape of said strip at both sides of said axis may be conformed to the shape of said curve at both sides of said selected point with the result that said needle extends at said predetermined angle to a line tangent to the curve at said selected point, a curved wall on the carrier concentric with the axis of adjustment thereof, a tool provided with a first portion engageable with said concentric wall and provided with a second portion having a line thereon which is radial when said first portion is engaged with said concentric wall, said radial line being registrable with said needle of the instrument, and an indicator on said tool for guiding the placing of a mark on said rear flat surface in line with said needle.

17. In an instrument of the class described, the combination of a frame provided with a rear face engageable with a rear flat surface having a curve thereon, a carrier rotatably adjustable on said frame about an axis in fixed relation to said frame and perpendicular to said rear face thereof, a resilient flexible strip on said carrier parallel with said rear face of the frame and spaced forwardly therefrom which strip is so positioned in relation to the frame and the carrier that an area of said flat surface behind and adjacent said strip is visible from the front, means on the carrier engaging the strip between the ends thereof for supporting said strip for pivotal movement about a pivotal axis coincident with the axis of adjustment of the carrier, an indicator needle connected with said strip at said pivotal axis thereof and freely movable with said strip which needle is at a fixed predetermined angle to the strip at the point of connection therewith and extends in general parallelism with said rear face of the frame, means on the carrier for flexing the strip at both sides of said pivotal axis thereof so that, when said frame is positioned on said flat surface with said pivotal axis of the strip at a selected point on said curve, the shape of said strip at both sides of said axis may be conformed to the shape of said curve at both sides of said selected point with the result that said needle extends at said predetermined angle to a line tangent to the curve at said selected point, a convex wall on the carrier concentric with said axis of adjustment thereof and at the opposite side of said axis from said flexible strip and said needle, a tool provided with a first portion engageable with said convex wall and provided with a second portion opposite said first portion and having a line thereon which is radial when said first portion is engaged with said convex wall, said radial line being registrable with said needle of the instrument, and an indicator on said tool for guiding the placing of a mark on said rear flat surface in line with said needle.

No references cited.